Feb. 15, 1955  E. STENGEL  2,702,124
WATER CLARIFICATION SYSTEM
Filed Feb. 20, 1951  3 Sheets-Sheet 1
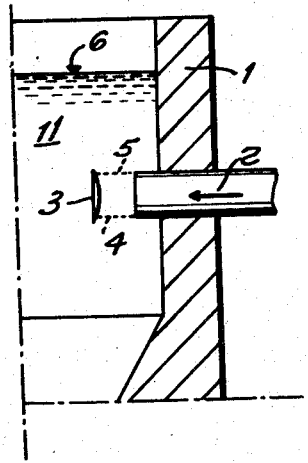
FIG.1.
FIG.2.
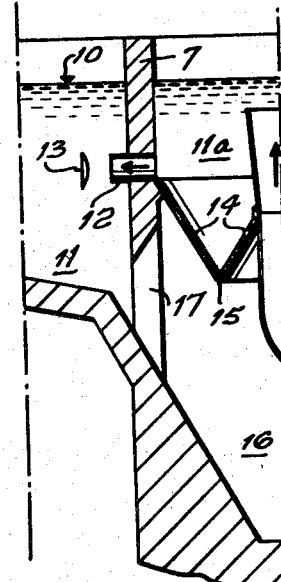
FIG.3a.
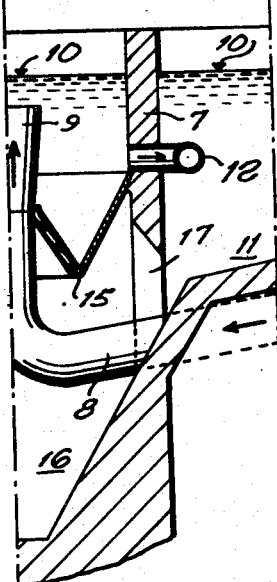
FIG.3b.
FIG.4a.
FIG.4b.
INVENTOR
ERWIN STENGEL
BY Feb. 15, 1955  E. STENGEL  2,702,124
WATER CLARIFICATION SYSTEM
Filed Feb. 20, 1951  3 Sheets-Sheet 3
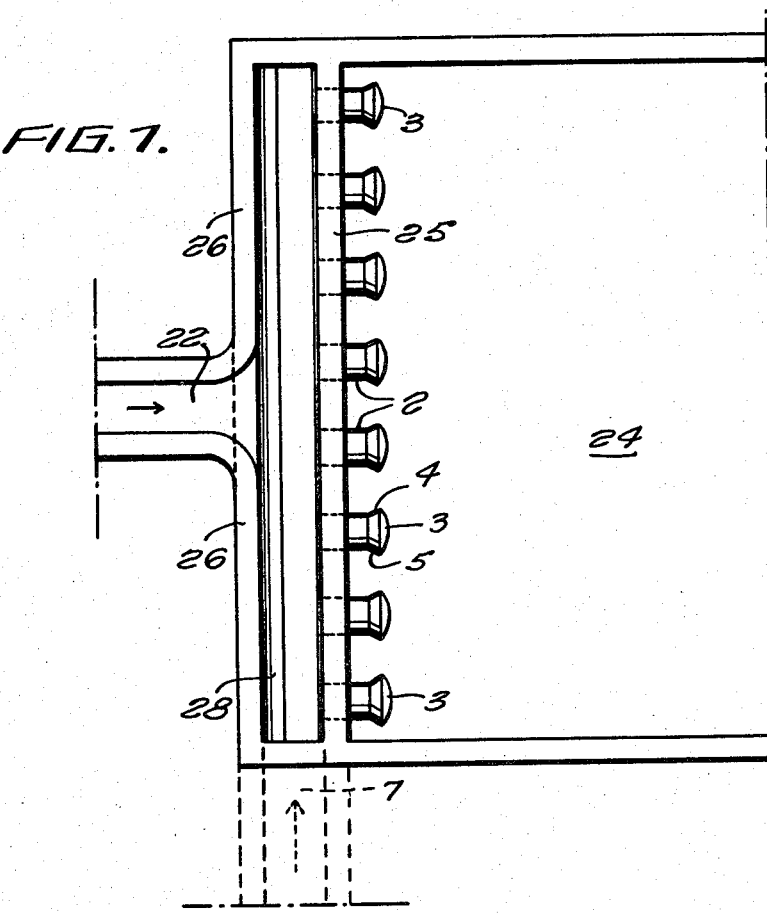
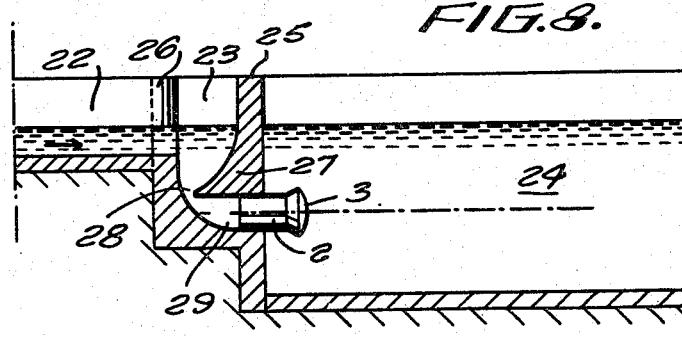
INVENTOR
ERWIN STENGEL
BY

United States Patent Office 2,702,124
Patented Feb. 15, 1955

2,702,124

WATER CLARIFICATION SYSTEM

Erwin Stengel, Karlsruhe (Baden), Germany

Application February 20, 1951, Serial No. 211,826

Claims priority, application Germany June 7, 1950

4 Claims. (Cl. 210—51)

My present invention relates to a waste water clarification system of the type comprising a separation tank for the elimination of substances suspended in the water.

It is an object of my present invention to provide a water clarification system in which a non-turbulent laminar flow is assured throughout the entire cross-section of the separation tank.

It is another object of my invention to effectively and efficiently remove from waste water all substances suspended therein.

It is a further object of my invention to provide a clarification system which can be built at low cost.

With the above objects in view my present invention mainly consists of a water clarification system comprising, a separation tank, a plurality of equally spaced feeding pipes arranged at substantially half the depth of the separation tank and provided with deflecting bodies for causing a laminar, non-turbulent flow through the separation tank.

In a preferred embodiment of my invention the deflecting bodies have substantially the shape of curved perforated disks each facing said pipes with its concave face, and arranged spaced a short distance therefrom.

In a specific arrangement of my present invention I provide a separation tank, a feeding chamber adjacent to the separation tank, a wall separating the feeding chamber from the separating tank, a projecting portion of the wall projecting into the feeding chamber dividing the feeding chamber into an upper and lower chamber communicating through at least one longitudinal slot, the cross-sectional area of the slot being substantially equal to the cross-sectional area of the pipes, the bottom of the lower chamber being disposed immediately below the feeding pipes and being curved and streamlined so as to assure a non-turbulent flow into the pipes, a plurality of feeding pipes projecting into the separation tank arranged in a horizontal row in the wall at substantially half the depth of the separation tank, a plurality of deflecting bodies disposed in the separation tank, each secured in front of one of the pipes spaced therefrom, supporting means for supporting the deflecting bodies, and pipe means supplying water to be purified to the feeding chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partial cross-sectional view of a rectangular separation tank;

Fig. 2 is a partial plan view of the embodiment shown in Fig. 1;

Fig. 3a is a partial cross-sectional view of another embodiment of the present invention;

Fig. 3b is a partial cross-sectional view of a modification of the embodiment shown in Fig. 3a;

Fig. 4a is a plan view of the embodiment shown in Fig. 3a;

Fig. 4b is a plan view of the embodiment shown in Fig. 3b.

Fig. 7 is a plan view of a further embodiment of the present invention; and

Fig. 8 is a partial cross-sectional elevation of the embodiment shown in Fig. 7.

Figure 5:
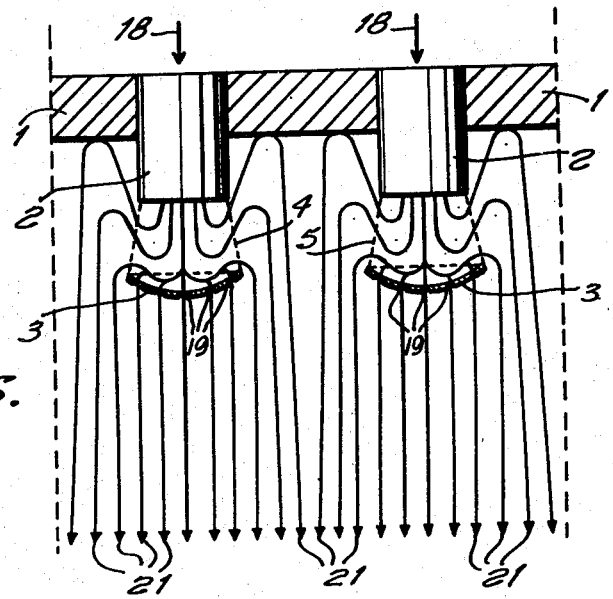
Fig. 5 is a cross-sectional plan view showing the laminar flow in the separation tank.

Clarification systems are known in which the waste water is first fed into a feeding chamber from where it flows through pipes into a separation tank. In the known arrangements of that type the waste water flows through the separation tank unevenly and turbulently, so that the cross-section of the separation tank is not fully used.

With the object of providing a laminar non-turbulent flow through the entire cross-section of the separation tank I provide feeding pipes at a distance of substantially half the depth of the separation tank. Said feeding pipes are spaced equally from each other and in front of the feeding pipes at substantially the same distance deflecting bodies are provided.

With the object of assuring a laminar flow in the separation tank I provide perforated deflecting bodies in the shape of curved disks facing the feeding pipes with their concave faces. The size and curve of the disks and the number, size and arrangement of the perforations and the distance from the feeding pipes should be chosen in such a way as to assure a laminar flow throughout the entire cross-section of the separation tank. Such deflecting bodies may be built into existing clarification systems and improve their efficiency.

For the proper functioning of a clarification system it is necessary to avoid that heavy substances contained in the waste water settle in the supply channel. Arrangements are known in which the waste water flows through a supply channel at a comparatively high velocity in order to avoid this drawback. However, the entering of the waste water into the feeding chamber results in a substantial increase of the cross-section through which the water is flowing and makes a uniform distribution of the waste water in the feeding chamber difficult, which in turn causes the water entering the separation tank from different feeding pipes to have a different velocity.

In order to eliminate this drawback I provide the wall separating the feeding chamber from the separation tank with a projecting portion, dividing the feeding chamber into an upper chamber and a lower chamber. Water is dammed up in the upper chamber and serves as a cushion for the water entering the feeding chamber. Furthermore, in an arrangement of that type a direct feed to the feeding pipes is avoided, particularly if the projecting portion is projecting so far to the rear wall of the feeding chamber that the communication between the upper and lower chamber is effected through a slot only. This slot has preferably a cross-sectional area equal to the cross-sectional area of all feeding pipes combined.

In a preferred embodiment of my invention the bottom of the lower chamber is curved and streamlined, and the feeding pipes are disposed on the bottom of the lower chamber, so that the water flows smoothly into the pipes, and settling of heavy substances within the feeding chamber is avoided.

In a modified embodiment of my invention comprising a circular feeding chamber, I provide an annular funnel means dividing the feeding chamber into an upper and lower chamber whereby the velocity of the waste water entering the feeding chamber is diminished. I also provide the pipe supplying the waste water to the clarification system with a conical outwardly flared portion for the same purpose. The reducing of the velocity of the flow in the feeding chamber effects settling of the heavier substances contained in the waste water. Simultaneously lighter substances float on the water surface in the feeding chamber, and can be easily removed. In this arrangement the water level in the feeding chamber remains substantially constant and every feeding pipe is subject to the same hydraulic pressure.

In Fig. 1 a feeding pipe 2 is shown provided with a deflecting body 3 which is supported by rods 4 and 5 connecting it to the feeding pipe. The feeding pipes 2 are disposed in a wall 1 of the separation tank at substantially half the depth of the tank or half the distance between water level and tank bottom. The feeding pipes are also shown in Fig. 2 from which can be seen that the feeding pipes 2 are equally spaced from each other.

Other embodiments of the invention are shown in Figs. 3a, 3b and 4a, 4b. According to these embodiments the feeding chamber 16 is circular and disposed in a circular separation tank. The waste water enters the feeding chamber 16 through a pipe 8 which vertically extends through the feeding chamber and is provided with a conically flared end portion 9 for reducing the velocity of the entering water. The feeding pipes 12 are disposed in the wall 7 separating the feeding chamber from the separation tank 11 at substantially half the depth of the tank and are each provided with deflecting bodies 13. An annular funnel means 14 is placed around the supply pipe 9 and supported by a shoulder of the wall 7 around its outer edge, whereby the feeding chamber is divided in an upper chamber 11a and a lower chamber which communicate through a circular slot 15 in said annular funnel means 14. Heavy substances will be deposited at the bottom of the lower chamber of the feeding chamber 16, and it is also possible to push such substances from the bottom of the separation tank 11 through openings 17 in the wall 7 into the lower chamber of the feeding chamber 16.

In the modification of this embodiment shown in Figs. 3b and 4b, the feeding pipes 12a are T-shaped and provided with cross pieces. In this modification the deflecting bodies 13 are placed between opposite openings of two adjacent pipes.

In another embodiment of the deflecting bodies shown in Fig. 5, the arrow 18 shows the direction of the flow from a feeding chamber into the separation tank. The feeding pipes 2 are disposed in the wall 1 of the separation tank and provided with deflecting bodies having the shape of a perforated curved round disk 3, supported by rods 4 and 5. As has been proven in extensive tests, the water entering the separation tank through the pipes 2 is partly deflected by the concave disks against wall 1 from where it is thrown back again and flows through the separation tank. The perforations 19 allow a partial flow through the deflecting bodies assuring a laminar flow throughout the entire cross-section of the separation tank, if the perforations and the curve of the disks, as well as their distance from the reflecting wall are suitably chosen.

Figure 6:
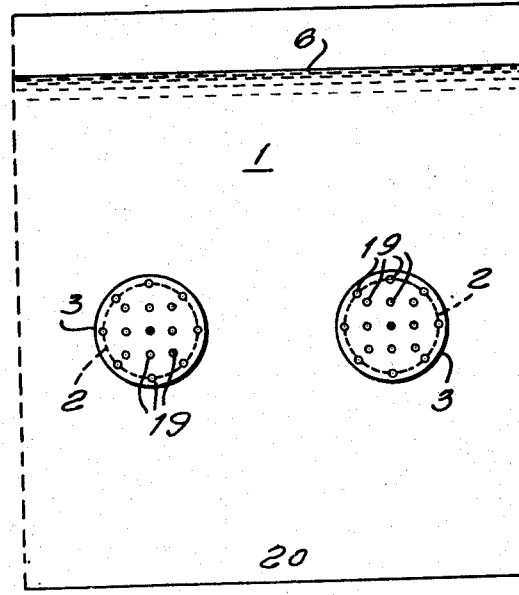
Fig. 6 is a front elevation of the separation tank shown in Fig. 5.

The perforations 19 can be seen clearly in Fig. 6, and from that figure it also can be seen that the feeding pipes are arranged at substantially half the distance between the water level 6 and the bottom of the tank 20.

In the embodiment shown in Fig. 7 the water enters the feeding chamber 23 through a channel 22 in the direction of the arrow. The separation tank 24 is separated from the feeding chamber 23 by a wall 25 in which the feeding pipes 2 provided with deflecting bodies 3 are disposed at substantially half the distance between the water level and the bottom of the separation tank. The wall 25 is provided with a curved projecting portion 27 extending almost to the rear wall 26 of the feeding chamber and defining with it a slot 28 through which the upper and lower part of the feeding chamber are in fluid communication. Slot 28 may extend throughout the entire length of the feeding chamber, but it is also possible to have the projection 27 extend to the wall 26 and provide a number of slots in the thus formed bottom of the upper part of the feeding chamber.

Preferably the corner 29 formed by the rear wall 26 and the bottom of the lower chamber of the feeding chamber is curved and leads to the feeding pipes 2 which are disposed at the bottom of the chamber whereby the water flows directly into the pipes and settling of heavy substances in the feeding chamber is avoided. The water cushion forming above the projection 27 assures a uniform distribution of the water entering through supply channel 22 along the entire length of the feeding chamber 23, so that the hydraulic pressure on all feeding pipes is substantially equal, even if the supply channel 22 is arranged longitudinally as shown in broken lines in Fig. 7. Preferably the bottom of the upper chamber formed by projection 27 is also curved.

By this arrangement a uniform non-turbulent laminar flow through the separation tank is effected, particularly if perforated concave deflecting bodies are provided. It is an advantage of my invention, that the entire area of the separation tank is fully used, so that the required structure is reduced in size, and consequently the better results can be obtained at lower cost comparing with the known water clarification systems.

It will be understood that each of the elements described above, or two or more together, may also find a useful application in other types of water clarification systems differing from the types described above.

While I have illustrated and described the invention as embodied in a clarification system provided with deflecting bodies, I do not intend to be limited to the details shown, since various modifications and structural changes may be made without departing in any way from the spirit of my invention.

What I claim as new and desire to secure by Letters Patent is:

1. A water clarification system, comprising in combination, a separation tank; a feeding chamber associated with said separation tank; a wall separating said feeding chamber from said separating tank; a projecting portion of said wall projecting into said feeding chamber dividing said feeding chamber into an upper and lower chamber communicating through at least one longitudinal slot; a plurality of horizontal feeding pipes projecting into said separation tank arranged in a horizontal row in said wall immediately below said projecting portion at substantially half the depth of said separation tank; and a plurality of spaced deflecting bodies disposed in said separation tank, each secured in front of one of said pipes spaced therefrom; and adapted to deflect toward said wall water flowing out of said feeding pipes so that water reflected by said wall passes through said separation tank in a horizontal and linear non-turbulent flow.

2. A water clarification system, comprising in combination, a separation tank; a feeding chamber associated with said separation tank and having a water inlet; a wall separating said feeding chamber for said separating tank; a projecting portion of said wall projecting into said feeding chamber dividing said feeding chamber into an upper and lower chamber communicating through at least one longitudinal slot; a plurality of horizontal feeding pipes projecting into said separation tank arranged in a horizontal row in said wall immediately below said projecting position at substantially half the depth of said separation tank and having a cross-sectional area substantially equal to the cross-section area of said slot; and a plurality of spaced dish-shaped deflecting bodies disposed in said separtion tank, each secured in front of one of said pipes spaced therefrom, each dish-shaped deflecting body facing the corresponding feeding pipe with the concave face thereof, and having a diameter slightly larger than the diameter of said feeding pipe so as to be adapted to deflect toward said wall water flowing out of said feeding pipes so that water reflected by said wall passes through said separation tank in a horizontal and linear non-turbulent flow.

3. A water clarification system, comprising in combination, a separation tank; a feeding chamber associated with said separation tank and having a water inlet; a wall separating said feeding chamber from said separating tank; a projecting portion of said wall projecting into said feeding chamber dividing said feeding chamber into an upper and lower chamber communicating through at least one longitudinal slot, the bottom of said lower chamber being curved and streamlined so as to assure a non-turbulent flow; a plurality of horizontal feeding pipes projecting into said separation tank arranged in a horizontal row in said wall immediately below said projecting portion on said bottom of said lower chamber at substantially half the depth of said separation tank; and a plurality of spaced perforate dish-shaped deflecting vertically arranged discs disposed in said separation tank, each secured in front of one of said pipes spaced therefrom, each dish-shaped deflecting body facing the corresponding feeding pipe with the concave face thereof, and having a diameter slightly larger than the diameter of said feeding pipe so as to be adapted to deflect toward said wall water flowing out of said feeding pipes so that water reflected by said wall passes through said separation tank in a horizontal and linear non-turbulent flow.

4. A water clarification system, comprising in combination, a separation tank; a feeding chamber associated with said separation tank and having a water inlet; a wall separating said feeding chamber from said separating tank; a plurality of equally spaced horizontal feeding pipes projecting into said separation tank arranged in a horizontal row in said wall at substantially half the depth of said separation tank; a curved projecting portion of said wall projecting into said feeding chamber immediately above said pipes and dividing said feeding chamber into an upper and a lower chamber, the bottom of said lower chamber being disposed immediately below said pipes and being curved and streamlined so as to assure a non-turbulent flow into said pipes; a plurality of spaced perforate dish-shaped deflecting bodies disposed in said separation tank, each secured in front of one of said pipes spaced therefrom, each dish-shaped deflecting body facing the corresponding feeding pipe with the concave face thereof, and having a diameter slightly larger than the diameter of said feeding pipe so as to be adapted to deflect toward said wall water flowing out of said feeding pipes so that water reflected by said wall passes through said separation tank in a horizontal and linear non-turbulent flow; supporting means for supporting said deflecting bodies; and pipe means supplying water to be purified to said feeding chamber.

References Cited in the file of this patent

UNITED STATES PATENTS

| | | |
|---|---|---|
| 2,098,463 | Morehead | Nov. 9, 1937 |
| 2,118,157 | Camp | May 24, 1938 |
| 2,155,960 | Thomas | Apr. 25, 1939 |
| 2,185,785 | Dorr et al. | Jan. 2, 1940 |
| 2,267,516 | Adams | Dec. 23, 1941 |
| 2,417,688 | Jeffery | Mar. 18, 1947 |

FOREIGN PATENTS

| | | |
|---|---|---|
| 79,563 | Austria | Dec. 29, 1919 |
| 446,086 | Germany | June 21, 1927 |
| 28,977 | Great Britain | A. D. 1906 |
| 516,440 | Germany | Jan. 22, 1931 |